(12) United States Patent
Petrie

(10) Patent No.: US 10,906,449 B2
(45) Date of Patent: Feb. 2, 2021

(54) HOIST PIVOT ARRANGEMENT FOR A DUMP TRUCK

(71) Applicant: WILLINGDON PROPERTIES PTY LTD, Brisbane (AU)

(72) Inventor: Mark Petrie, Brisbane (AU)

(73) Assignee: WILLINGDON PROPERTIES PTY LTD, Brisbane (AU)

( * ) Notice: Subject to any disclaimer, the term of this patent is extended or adjusted under 35 U.S.C. 154(b) by 0 days.

(21) Appl. No.: 15/770,402

(22) PCT Filed: Oct. 21, 2015

(86) PCT No.: PCT/AU2015/050650
§ 371 (c)(1),
(2) Date: Apr. 23, 2018

(87) PCT Pub. No.: WO2017/066819
PCT Pub. Date: Apr. 27, 2017

(65) Prior Publication Data
US 2018/0312097 A1     Nov. 1, 2018

(51) Int. Cl.
*B60P 1/16*     (2006.01)
*B60P 1/28*     (2006.01)

(52) U.S. Cl.
CPC ............. *B60P 1/283* (2013.01); *B60P 1/16* (2013.01); *B60P 1/28* (2013.01); *B60P 1/286* (2013.01)

(58) Field of Classification Search
CPC .. B60P 1/283; B60P 1/286; B60P 1/16; B60P 1/28

(Continued)

(56) References Cited

U.S. PATENT DOCUMENTS 2,172,138 A * 9/1939 Harley ................ B60P 1/20
                                              298/22 B
2,488,790 A * 11/1949 Wood ................. B60P 1/20
                                              298/22 B (Continued)

FOREIGN PATENT DOCUMENTS

AU    2014227433 A1 *  4/2016  ............ B60P 1/28
EP    1457381 A2      9/2004
FR    2833546 A1      6/2003

OTHER PUBLICATIONS

International Search Report for corresponding application PCT/AU2015/050650 filed Oct. 21, 2015; dated Dec. 7, 2015.

(Continued)

*Primary Examiner* — Stephen T Gordon
(74) *Attorney, Agent, or Firm* — Cantor Colburn LLP

(57) ABSTRACT

A dump truck (10) has a tipping body (30) in the form of a shell structure for holding material, which is pivotally mounted to the chassis (19) of the dump truck (10) for tilting about a transverse tipping axis. The truck (10) has at least one hoist pivot (33) configured for connection to a respective tipping ram (18) mounted to the chassis (19). The hoist pivot (33) is positioned to abut against the underside of the shell structure (36) when acted upon by the tipping ram (18) and tilt the tipping body (30) about the tipping axis. However, the hoist pivot (33) is not integral or welded to the shell structure (36). High stress concentrations are thereby avoided or significantly lessened in the tipping body shell in the vicinity of the hoist pivot, and there are no welds between the hoist pivot and the shell structure to become fatigued or crack. This enables a simplified and lighter single skin shell structure to be used for the tipping body.

17 Claims, 11 Drawing Sheets

(58) Field of Classification Search
USPC ..... 298/22 R, 22 P, 22 AE, 22 J, 22 B, 22 D, 298/17 S; 296/183.2
See application file for complete search history.

(56) References Cited

U.S. PATENT DOCUMENTS

| | | | |
|---|---|---|---|
| 2,731,293 | A | 1/1956 | Hutchinson |
| 3,202,458 | A | 8/1965 | Domes |
| 3,711,157 | A * | 1/1973 | Smock .................... B60P 1/165 298/8 R |
| 3,938,238 | A | 2/1976 | Kershaw |
| 4,148,528 | A | 4/1979 | Channell |
| 6,592,172 | B2 | 7/2003 | Fujan |
| 6,960,055 | B2 | 11/2005 | Musso |

OTHER PUBLICATIONS

Written Opinion of the International Searching Authority for corresponding application PCT/AU2015/050650 filed Oct. 21, 2015; dated Dec. 7, 2015.

Examination report for corresponding Australian application 2015412585; Report dated May 24, 2019.

* cited by examiner

HOIST PIVOT ARRANGEMENT FOR A DUMP TRUCK

TECHNICAL FIELD

This invention relates to tipping or dump trucks. In particular, the invention is directed to an improved hoist pivot arrangement which reduces stress concentrations in the tipping body of a dump truck.

BACKGROUND ART

Dump trucks are utilised for transporting and discharging bulk material, and generally comprise a chassis and a tipping body pivotally mounted to the chassis. In a rear dump truck, the tipping body is pivotally mounted near the rear of the chassis, for tilting about an axis transverse to the longitudinal axis of the chassis. In mine sites, rear dump trucks are normally used for transporting excavated material to a loading facility or other destination where the transported material is discharged to the rear of the truck by tilting the tipping body about the transverse tipping axis. Typically, such rear dump trucks utilise a pair of laterally spaced tipping rams connected between the truck chassis and the tipping body forwardly of the transverse tipping axis, to tilt the tipping body.

A tipping body for a rear dump truck typically comprises a load containment shell which is designed to position the load so as to provide a desired weight distribution on the axles of the vehicle, and is formed to facilitate free discharge of the material from the rear of the shell when tipped. The tipping body normally has a relatively smooth uninterrupted inside face, and a central longitudinally extending support structure on the underside of the shell. This support structure incorporates pivot mounts for the tipping body, which are spaced apart laterally to provide stability of the tipping body.

Due to the heavy loads carried by such tipping bodies and the abrasive nature of the carried material, the load shells are subjected to extreme wear and tear and often require replacement. Replacement bodies must substantially conform to the standard supporting arrangement provided on the truck by the original equipment manufacturers.

Rear dump trucks used on mine sites typically have a relatively short longitudinal spacing between the tipping axis and the connection of the tipping rams to the tipping body, and thus extremely high loads are applied to the tipping body by the tipping rams. Consequently, conventional tipping bodies are formed with load spreading reinforcements about the ram connections to the tipping body so as to reduce the induced stress concentrations resulting from the lifting forces applied by the rams. In addition, as such tipping bodies are mostly fabricated by welding, it is necessary to form reinforcements which terminate at zones of low stress concentration to mitigate failure at weld locations as any such failure decreases the service life of the body. These load spreading reinforcements substantially increase the weight of such tipping bodies and this reduces the payload that the dump trucks can transport.

The weight of such tipping bodies has been reduced in recent years by the use of formable and weldable structural steel plate with a surface hardness comparable with wear plate. This has enabled the production of tipping bodies with internal surfaces having good abrasive wear properties without the need for additional wear plates which add weight to the body. The high strength of such plate has also made it possible to reduce the thickness of the floor and wall plates of the containment shell, with the result that tipping bodies can be built which are relatively light. However, as the plate thickness utilised for the body and reinforcing ribs is reduced in the quest for lightweight bodies, they become more susceptible to premature fatigue cracking causing increased maintenance costs and/or reduced life. In particular, the region of each hoist pivot is prone to stress failure, especially weld joints between the hoist pivot and tipping body.

In this application, the term 'hoist pivot' or 'hoist coupler' is intended to mean the member, fitting, component or arrangement connected to the upper end of a tipping ram which engages the tipping body. In known dump trucks, each hoist pivot is typically a steel plate or pair of steel plates with a bore to receive a cross-pin, for pivotal connection to the upper end of a respective tipping ram. The steel plate is normally welded to the underside of the load containment shell, and becomes integral with the shell.

However, it has been found that in order to avoid fatigue cracking, such as along weld connections of the hoist pivot to the tipping body, the structure associated with the connection of the hoist pivot is necessarily complicated and heavy and creates an impediment to forming a durable lightweight body.

It is a preferred aim of the invention to provide an improved hoist pivot arrangement for a dump truck which overcomes or at least ameliorates the disadvantages of the prior art.

SUMMARY OF INVENTION

In one form, the invention provides a tipping body for a dump truck, comprising a shell structure for holding material, the shell structure being configured for mounting to the dump truck so as to be pivotable about a transverse tipping axis, a support structure extending longitudinally along the underside of the shell structure, and at least one hoist pivot configured for connection to a respective tipping ram connected to a chassis of the dump truck, the hoist pivot being positioned to abut against the underside of the shell structure when acted upon by the tipping ram and tip the tipping body about the tipping axis, wherein the hoist pivot is not integral or welded to the shell structure.

In another form, the invention provides a dump truck comprising a chassis, a tipping body pivotally mounted to the chassis so as to be pivotable about a transverse tipping axis, and at least one tipping ram mounted between the chassis and the tipping body, wherein the tipping body comprises a shell structure for holding material, a support structure extending longitudinally along the underside of the shell structure, and at least one hoist pivot configured for connection to a respective tipping ram, the hoist pivot being positioned adjacent the underside of the shell structure and operative to abut against the underside of the shell structure when the tipping ram extends to thereby tip the tipping body about the tipping axis, characterised in that the hoist pivot is not integral or welded to the shell structure.

Since each hoist pivot is separate from the tipping body shell structure, high stress concentrations are avoided or significantly lessened in the tipping body shell in the vicinity of the hoist pivot. Moreover, there are no welds between the hoist pivot and the shell structure to become fatigued or crack. This results in a simplified structure for the tipping body which may be fabricated lighter than known fully reinforced welded structures, enabling higher payloads to be carried within permissible total load limits. For example, the underside of the shell at opposite sides of the support structure and forward of the tipping axis can be formed as a single skin structure substantially free of transverse reinforcement formations.

Typically, the support structure is located centrally of the shell structure in a transverse direction, and the tipping body comprises a pair of hoist pivots located on opposite sides of the support structure.

In one embodiment, each hoist pivot is mounted to the support structure. Each hoist pivot may be mounted to the support structure so as to be spaced from the underside of the shell structure when its respective tipping ram is retracted, but movable into abutment with the underside of the shell structure when its respective tipping ram is extended.

Each hoist pivot may be mounted on rods passing through the support structure.

Alternatively, opposite longitudinal ends of each hoist pivot may be pivotally connected to respective link members mounted on rods passing through the support structure.

In yet another alternative arrangement, each hoist pivot may be pivotally mounted or hinged to the support structure.

In another embodiment, each hoist pivot may be adhered to the underside of the shell structure. The bond between the hoist pivot and the tipping body should be capable of transferring shear loads imposed thereon while being incapable of creating undue stress concentrations in the shell.

Advantageously, a rigid elongate reinforcing member extends longitudinally between each hoist pivot and an anchor point on the tipping body for resisting longitudinal forces on the hoist pivot.

Each hoist pivot may have a planar load bearing upper face which operatively engages directly against the underside of the shell structure. If the shell structure is curved in that contact region, the load bearing upper face of the hoist pivot can be similarly curved to match the shell structure. A resilient pad or the like may be interposed between the upper face of the hoist pivot and the underside of the shell.

In yet another form, the invention provides a method of forming a connection between a tipping ram and a tipping body, comprising providing at least one hoist pivot having a fitting on its underside configured to be operatively connected to a respective tipping ram, and having a generally planar face on its upper side, and locating the hoist pivot adjacent against the underside of the tipping body, such that in use, the planar face of the hoist pivot is pushed against the underside of the tipping body by the tipping ram so as to cause the tipping body to tilt about a tipping axis, wherein the hoist pivot is not integral or welded to the shell structure.

In order that this invention may be more readily understood and put into practical effect, reference will now be made to the accompanying drawings which illustrate one or more preferred embodiments of this invention.

DESCRIPTION OF EMBODIMENTS OF INVENTION

Figure 1:
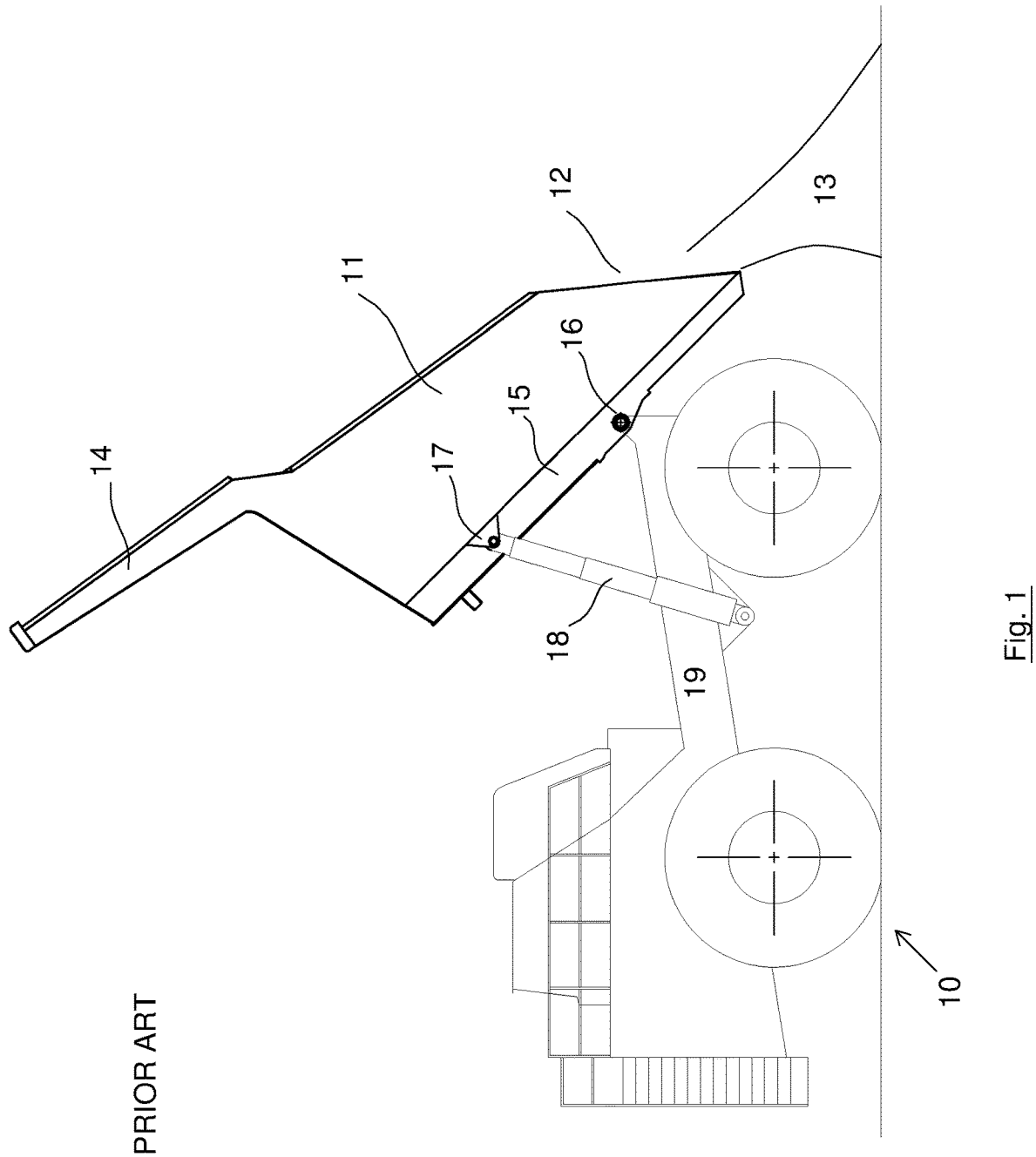
FIG. 1 is a diagrammatic side view of a typical prior art rear dump truck illustrating the tipping body in an elevated tipping attitude.

As shown in FIG. 1, a conventional rear dump truck 10 comprises a chassis 19 on which a tipping body is pivotally mounted. The tipping body is in the form of a load containment shell 11 formed with an open rear end 12 through which material transported therein is discharged, as illustrated at 13. The shell 11 also has an elevated front tray portion 14 which extends above and shields the driver's cabin of the truck 10 when the tipping body 20 is lowered to its loading or transport position. The shell 11 is supported by a central, longitudinally extending, base structure 15 on which are provided laterally spaced apart rear pivot mounts 16 for pivotal connection to the chassis. The pivot mounts 16 define a transverse axis about which the shell 11 can be tipped. The central base structure 15 also has a pair of laterally spaced apart hoist pivots 17 connected thereto, forwardly of the pivot mounts 16. The hoist pivots 17 are pivotally connected to the upper ends of laterally spaced respective telescopic hydraulic tipping rams 18 which are supported at their lower ends by the truck chassis 19.

Figure 2:
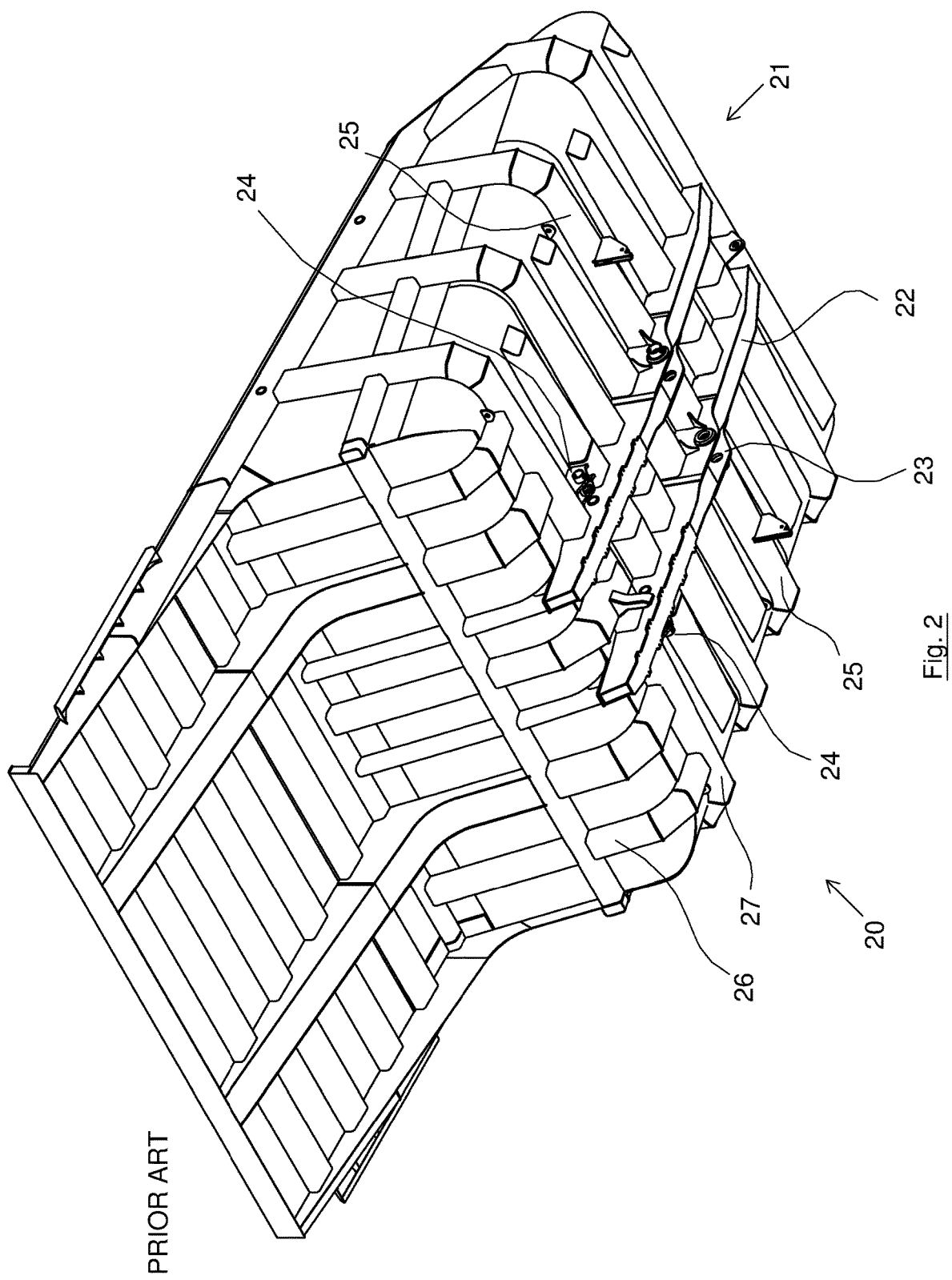
FIG. 2 is an underneath perspective view illustrating the reinforcement utilised in a typical prior art dump truck tipping body.

In one form of a conventional tipping body 20, illustrated in FIG. 2, the base structure 21 includes a pair of longitudinal rails 22 on which are provided rear tipping mounts 23 for pivotal connection to the truck chassis. Hoist pivots 24 are located on the outside of the respective longitudinal rails 22, for connection to respective tipping rams. These hoist pivots have to be offset from the longitudinal rails 22 to align with their respective tipping rams, and are therefore typically welded to the underside of the tipping body.

It will be seen that in addition to the longitudinal rails 22, a relatively complex reinforcing structure is used to distribute the loads applied to the tipping body 20. The reinforcements include transverse ribs 25 extending from the base structure 21 across the underside of the containment shell as well as longitudinal ribs 26 running from the forwardmost ribs 27. This relatively complex reinforcing structure adds considerable weight to the tipping body 20 and thus substantially reduces its payload. Moreover, high stress concentrations occur in the regions where the hoist pivots 24 are welded to the tipping body.

An improved hoist pivot arrangement according to one embodiment of this invention is illustrated in FIGS. 3 to 6. The improved hoist pivot arrangement is shown on a tipping body 30 which can be used as a replacement for a conventional tipping body for a rear dump truck. The tipping body 30 is configured to connect to the original pivot supports 16 and the tipping rams 18 provided on the rear dump truck 10.

On its underside, the tipping body 30 has a central support structure which comprises a pair of laterally or transversely spaced rails or frames 31 which extend longitudinally, and on which are provided the complementary transversely spaced tipping mounts 32 which connect to the pivot supports 16 provided on the truck 10 and which provide operative location for the tipping body 30.

The floor panels 36 of the containment shell of the tipping body 30 at opposite sides of the longitudinal frames 31 are preferably formed as single skin floor panels which extend uninterrupted from a rear stiffening beam 40, which limits outward deflection of the side walls of the tipping body when loaded, and a U-shaped reinforcing beam 41 which extends substantially horizontally along the side walls 42 from the stiffening beam 40 and across the front wall 43 from which the elevated front tray portion 14 extends.

Figure 5:
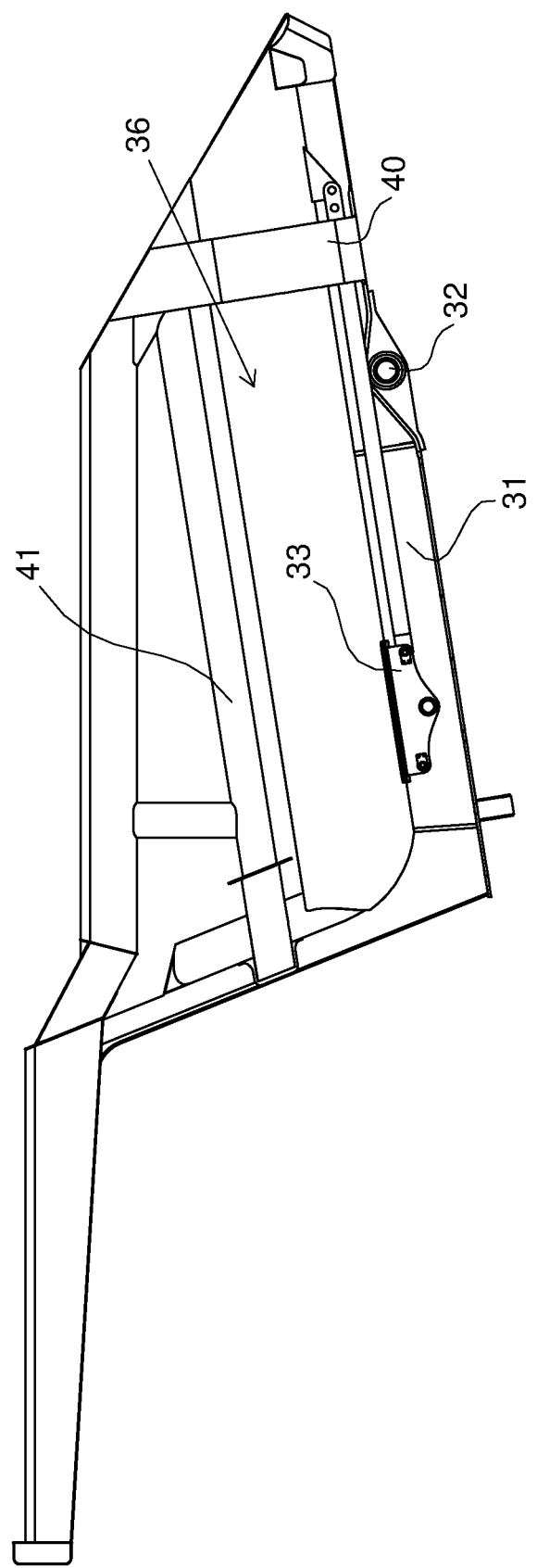
FIG. 5 is a side view of the tipping body illustrated in FIG. 3.
Figure 6:
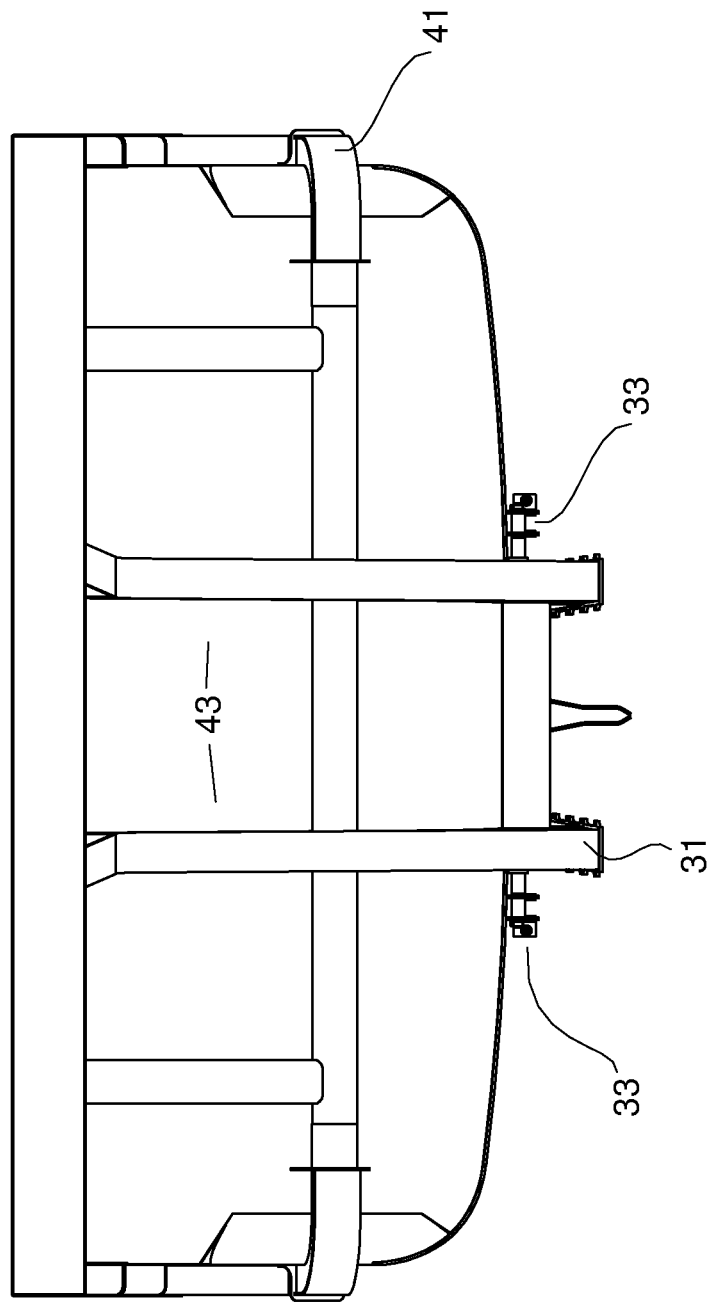
FIG. 6 is a front end view of the tipping body illustrated in FIG. 3.

As is more clearly illustrated in FIG. 5 the transition between the side floor portions 36 and the front wall 43 may be formed as a large radius curve so as to minimise stress concentrations which would occur at small radius bends or straight angle joints between the floor panels 36 and the front wall 43. In this configuration the undersides of the respective side floor panels 36 are plain surfaces, that is the floor panels are formed without abrupt cross-sectional discontinuities which could form localised stress concentrations.

Figure 3:
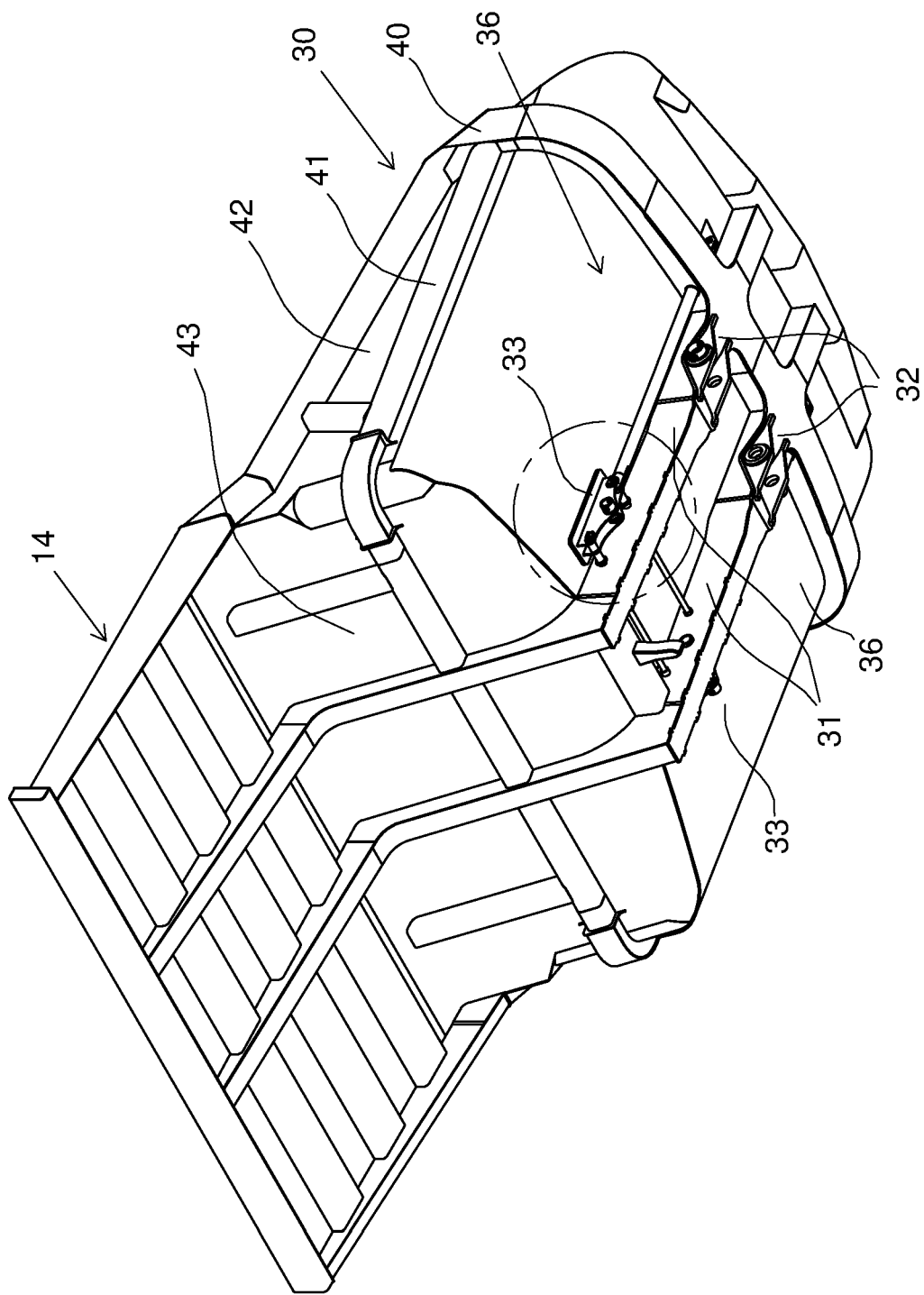
FIG. 3 is an underneath perspective view of a dump truck tipping body according to one embodiment of the invention.
Figure 4:
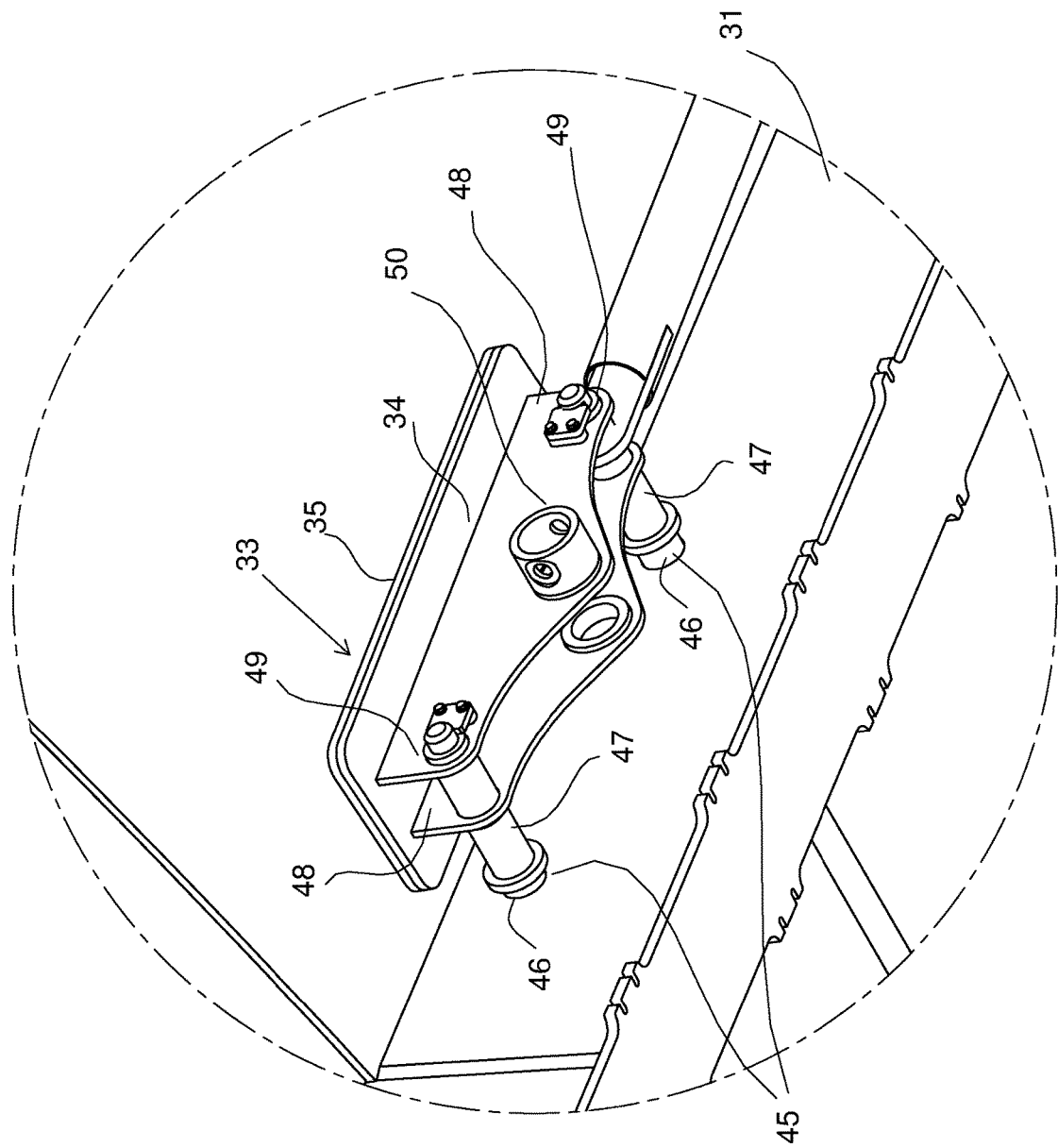
FIG. 4 is an enlarged detail of the hoist pivot encircled in FIG. 3.

Hoist pivots 33 are mounted to the respective frames 31, on the outside of the frames 31 as shown in FIG. 3, for pivot connection to respective tipping rams provided on the chassis of a rear dump truck, e.g. by pin or clevis connections. One hoist pivot 33 is shown in more detail in FIG. 4, and the other is of substantially similar construction and mounted in a mirror reversed manner.

The illustrated hoist pivot 33 comprises a load bearing pad 34, typically a steel plate, which may be provided on its upper side with a resilient pad 35 of an elastomeric material. The hoist pivot 33 also has a pair of spaced flanges 48, typically of steel plate, each having a pair of bushed bores 49 therein. Respective bores 49 in the flanges 48 are aligned for receiving a pair of locating rods 47. The locating rods 47 may each be a short stub mounted in a respective tubular mount or bushed bore 45 in the associated rail frame 31. Each locating rod 47 may be the end portion of a longer rod which passes transversely through the pair of frames 31, so that the hoist pivots 33 are mounted on opposite ends of two such long rods.

The flanges 48 of each hoist pivot provide a central mounting 50 for connection to the upper end of a tipping ram 18. The central mounting 50 may be formed by aligned bushed bores in the flanges, for receiving a connecting pin of the tipping ram.

The hoist pivots 33 are mounted so that they abut against the shell when the tipping rams are extended, and thereby apply force to the tipping body to raise it about its tipping axis. The hoist pivots 33 also bear the weight of the tipping body as it is lowered about its tipping axis.

However, a particular advantage of the present invention is that the hoist pivots are not welded or formed integrally with shell of the tipping body. Instead they are separate from the shell of the tipping body. In this manner, the high stresses associated with prior art hoist pivots are avoided, and there are no weld joints between the hoist pivots and the tipping body shell to fatigue or break.

The hoist pivots are mounted to the rail frames 31 so that in their rest position when they are not acted upon by the tipping rams, i.e. when the tipping body is in its lowered position, the hoist pivots are located at, or a short distance from, the bottom surface of the shell of the tipping body. Typically, the hoist pivots are located at 0 mm to 25 mm from the surface of the shell.

Where the hoist pivots are spaced from the bottom surface of the shell, the tubular mounts 45 can be bushed with resilient bushes 46 to ensure that the tipping rams 18 can move when acted upon by the tipping rams to abut against the floor panels 36 of the tipping body through the load-bearing pads 34. Alternatively, the interconnecting rods can flex or be loosely mounted in the tubular mounts to ensure that the hoist pivots 33 abut against the floor panels 36 when acted upon, so that the lifting forces are transferred primarily to the shell of the tipping body. For this purpose the interconnecting bars can extend through respective slots, and preferably vertical slots, formed in the rail frames of the support structure. Alternatively, the rods can be loose fitting and simply allow the pad to move.

In a modified embodiment, the hoist pivots 33 may be glued to the underside of the shell of the tipping body using a heavy duty adhesive. In this case, it is preferable that the resilient elastomeric pad 35 be provided between the load bearing pad 34 and the shell. An elastomeric pad, or an elastomeric layer of glue/bonding agent, or a suitable grout provides a flexible connection between the hoist pivot and the shell so that there is no transfer of shear strain.

In use, extension of the tipping rams 18 causes the hoist pivots 33 to bear against the underside of the floor panels 36 to pivot the forward end of the tipping body 30 upwardly about the tipping axis defined by the tipping mounts 32. The size and configuration of the pads are designed to distribute the loads such that stresses are within acceptable limits.

Due to the geometry of the rams 18 and pivot mounts on the truck 10, the rams 18 will initially provide a force component tending to move the hoist pivots 33 rearwardly along the panels 36 followed by a transition to a forward force component tending to move the hoist pivots 33 forwardly along the panels 36. These force components may be resisted by the transverse bars 47 in the tubular mounts 45 in the longitudinal rail frames 31, or the vertical slots, if utilised, or longitudinal link bars (described below). Moreover, any deflection will be at least partially resisted by the load carried in the shell which will be distributed over the floor of the tipping body 30.

Figure 7:
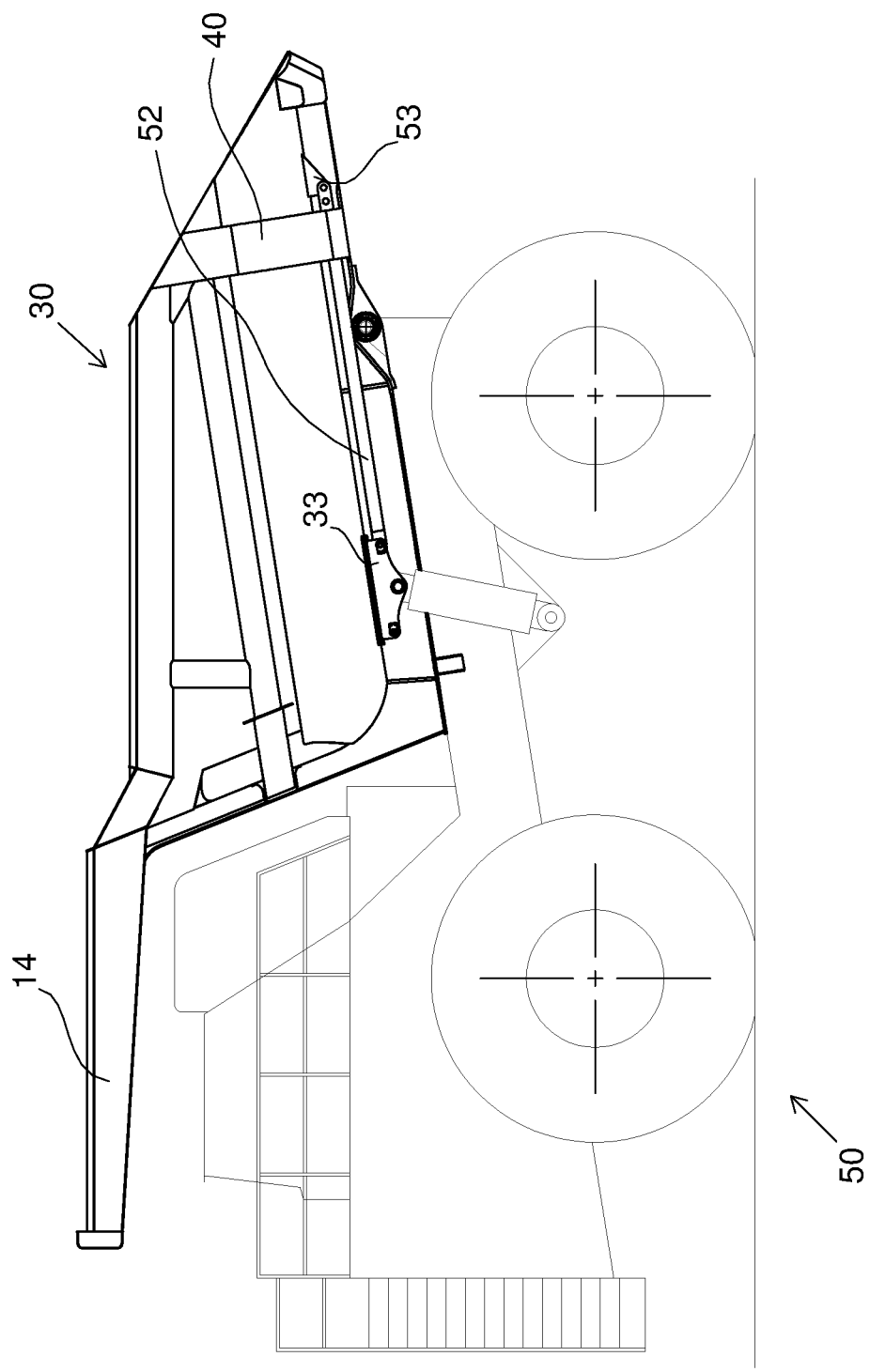
FIGS. 7 and 8 illustrate a dump truck body similar to the body illustrated in FIG. 3, in transport and tipping modes respectively, and additionally incorporating a longitudinal link for the hoist pivot.
Figure 8:
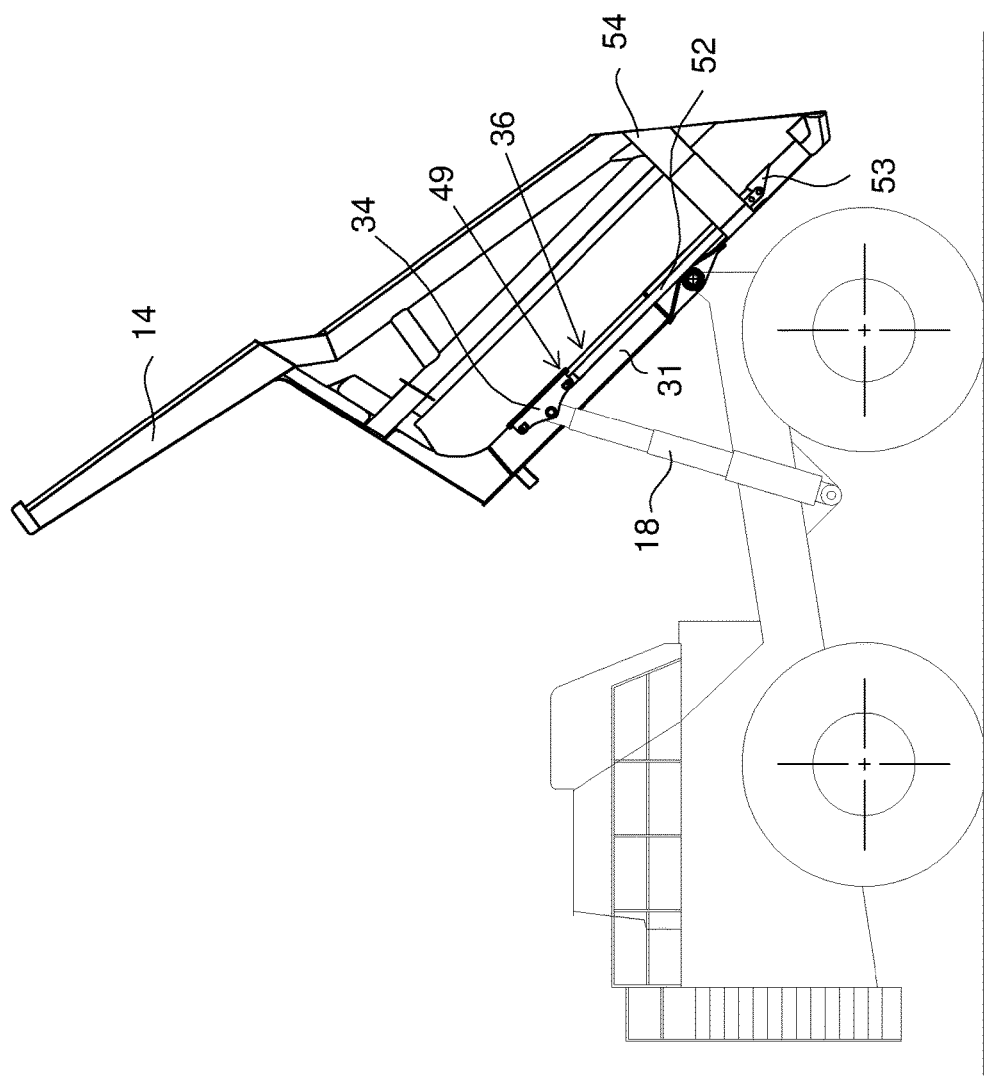
Figure 9:
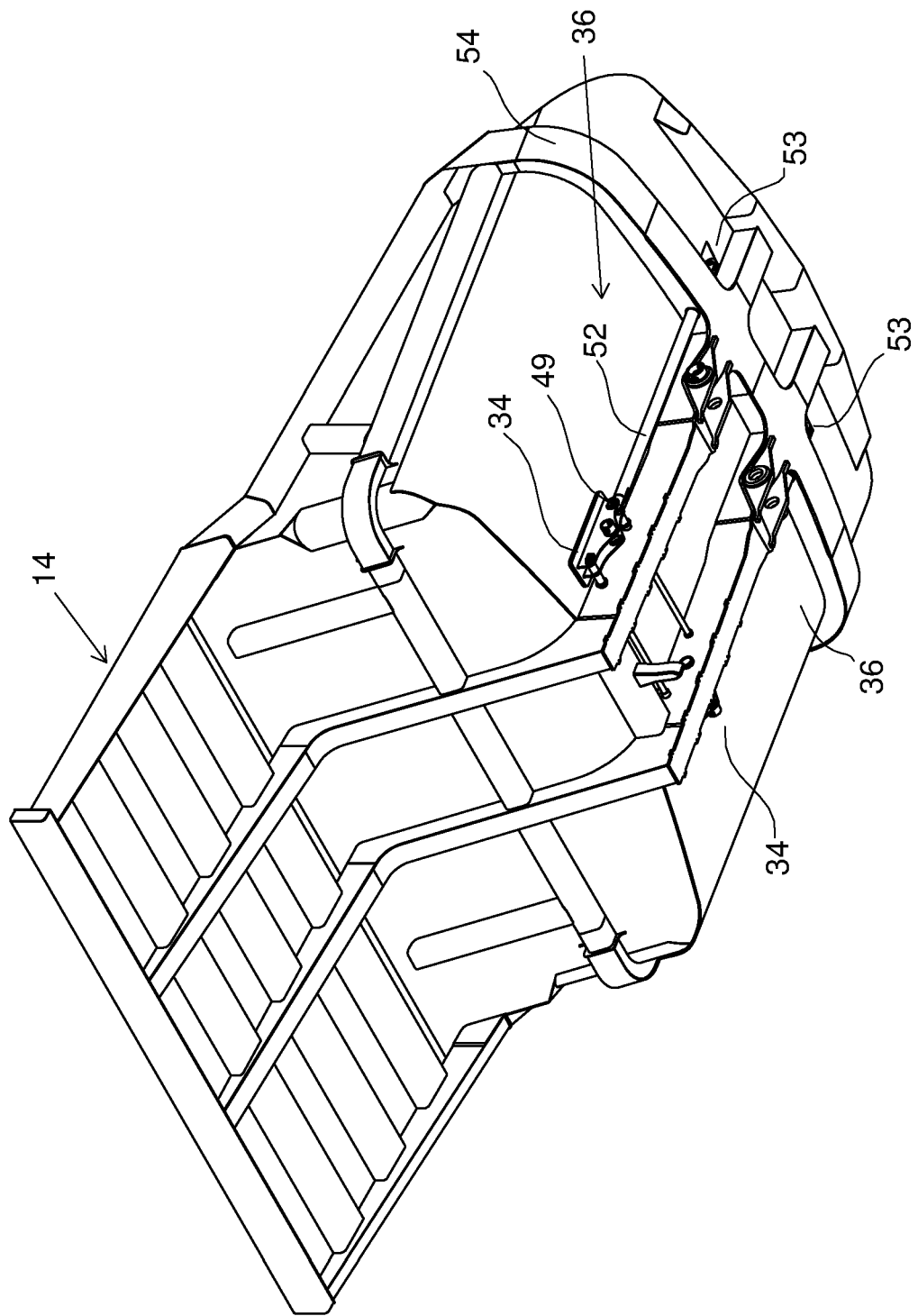
FIG. 9 is an underside perspective view of the tipping body illustrated in FIGS. 7 and 8.

Additional reinforcement may be provided against the rearward and forward force components mentioned above. In the modified embodiment illustrated in FIGS. 7, 8 and 9, compression/tension link members or bars 52 extend on opposite sides of the tipping body 30 from the rearmost mounting 49 of respective hoist pivots 33 to a rear transverse bar 53 located rearward of the frame 40.

Each link bar 52 acts as a compression member to resist rearward movement of the respective hoist pivot 33 during initial tilting of the body 30, and subsequently during the tilting process each link bar 52 acts as tension members resisting forward movement of the respective hoist pivot 33 along the underside of the floor portions 36.

No significant transverse force component is applied to the hoist pivots 33 and any slight force component will be resisted either by the frictional engagement between the hoist pivots 33 and the underside panels 36 of the tipping bodies or directly by the interconnecting bars 47.

Figure 10:
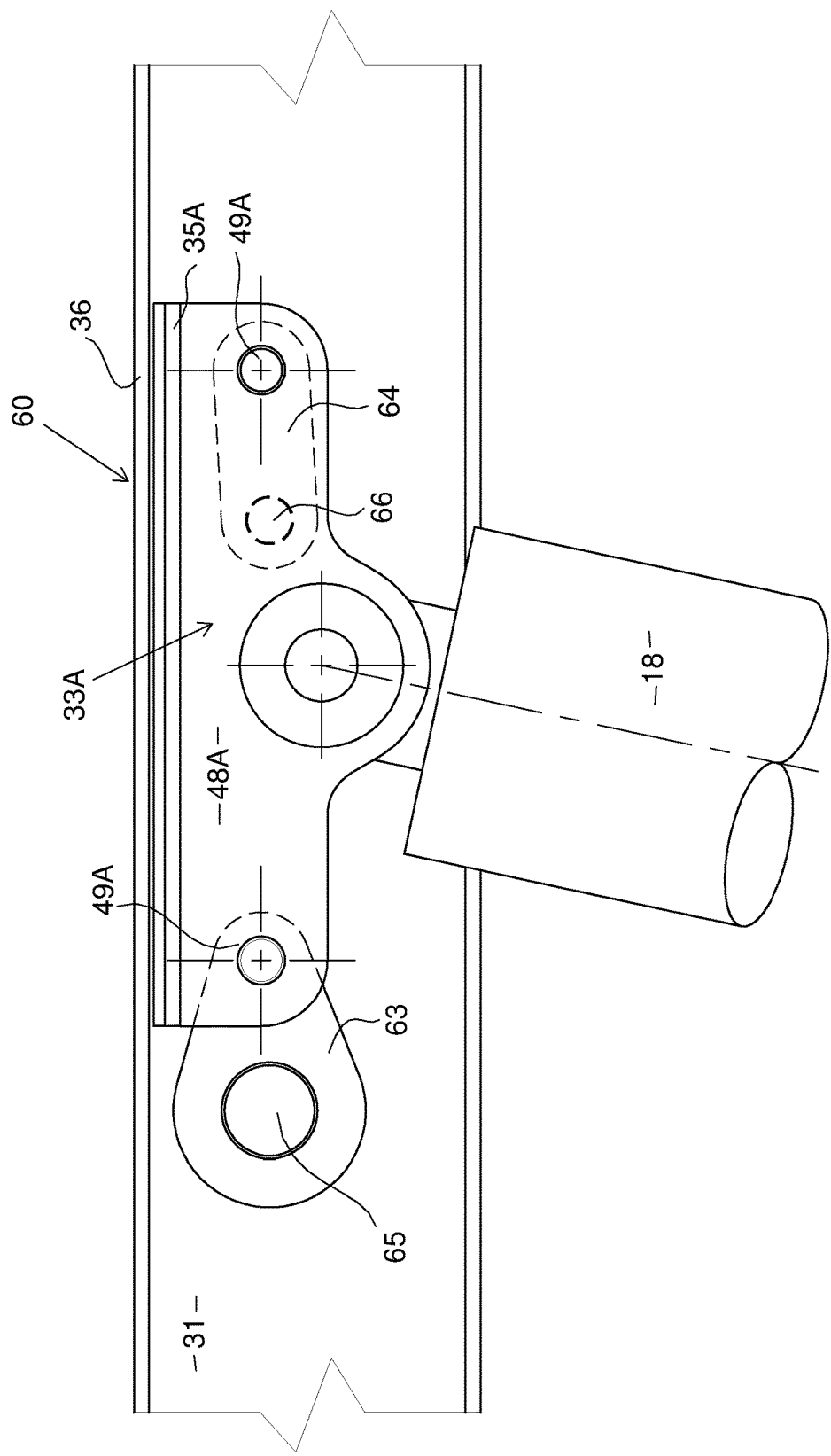
FIG. 10 illustrates another method of mounting the hoist pivot.

FIG. 10 illustrates a modified arrangement 60 for locating slightly modified hoist pivots 33A adjacent the floor 36 of the shell of the tipping body. Each hoist pivot 33A is connected to the upper end of a respective lifting ram 18 as described previously. The hoist pivot 33A is pin-connected at its forward bore mount 49A to a first trailing link 63 which is pivotally connected to a leading transverse interconnecting bar 65 supported by the longitudinal rail frames 31. The hoist pivot 33A is also pin-connected at its rearward bore mount 49A to a second trailing link 64 which is pivotally connected to a trailing transverse interconnecting bar 66 supported by the longitudinal frames 31. The leading bar 65 is a relatively large diameter bar able to resist the shear loads applied by the rams 18 during tipping operations, while the smaller transverse bar 66 provides additional operative location of the hoist pivot 33A.

Figure 11:
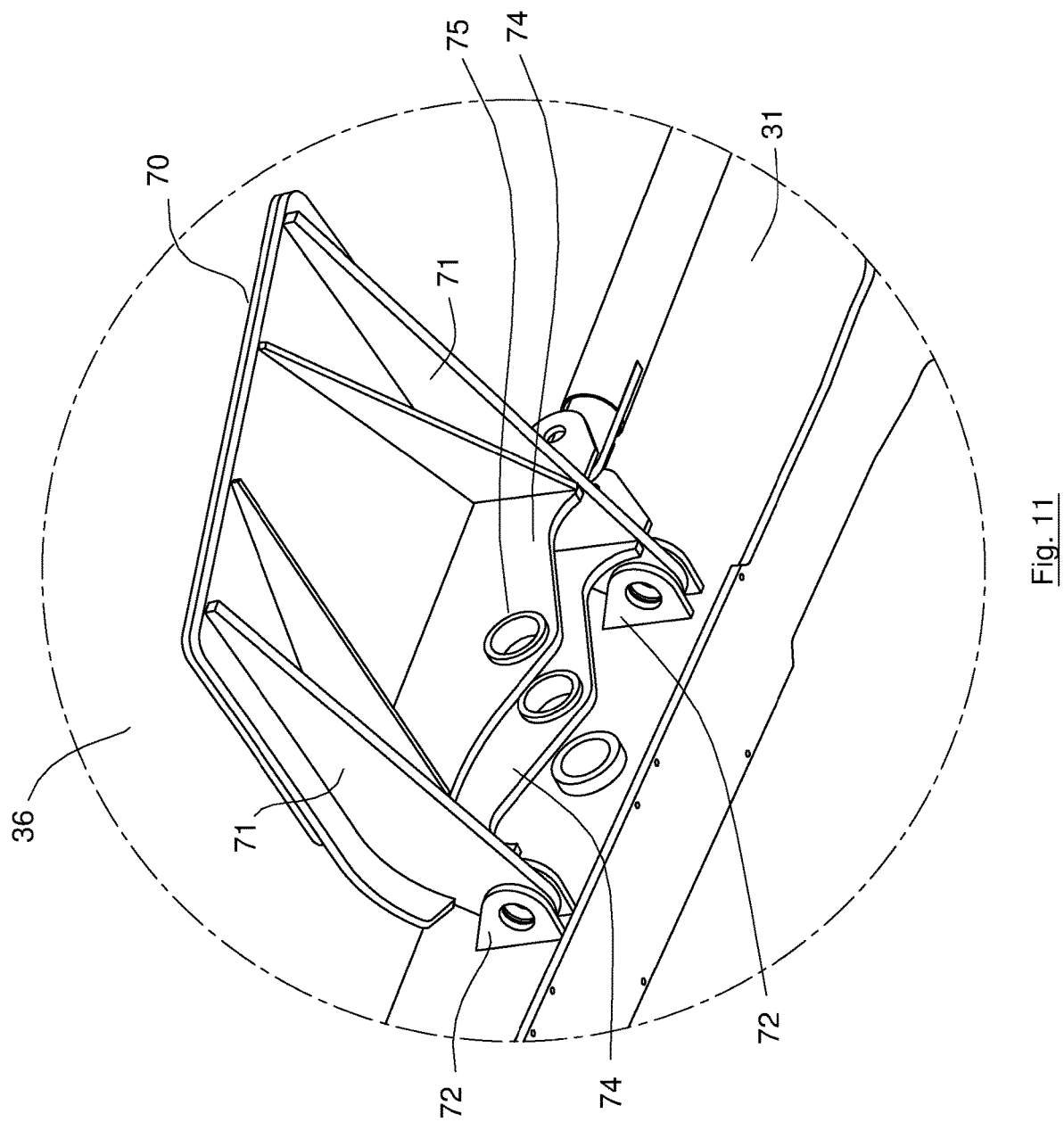
FIG. 11 is a perspective view of a hoist pivot according to another embodiment of the invention.

FIG. 11 illustrates a further embodiment of a hoist pivot according to the invention. In this embodiment, a hoist pivot 70 has a pair of spaced flanges 74, typically of steel plate, each having a pair of bushed bores therein to provide a central mounting 75 for connection to the upper end of a tipping ram, by a connecting pin of the tipping ram (in a similar manner to the hoist pivot 33 described above).

The hoist pivot 70 also has a pair of spaced flanges 71, each of which locates between a respective pair of spaced flanges 72 on a rail frame 31 of the truck chassis. A bore in each flange 71 aligns with bores in the respective pair of spaced flanges 72, so that a pin (not shown) can be inserted into the aligned bores to form a pin or clevis connection. In this manner, the hoist pivot 70 is effectively hinged to the rail frame 31. It is to be noted that the rail frame is not integral, welded or otherwise connected to the underside panel 36 of the tipper body, but is supported in close proximity thereto. Compression/tension link bars can also be provided as described above.

In use, when the tilting rams are extended, the hoist pivots 70 will pivot into abutment against the underside of the tipping body and the lifting force will be transferred to the tipping body. However, the load is spread between the hoist pivot load bearing pad on the underside of the tipping body and the pin connections to the chassis rail 31. In this manner, some of the load is distributed onto the chassis rail.

In yet another embodiment, the hoist pivots are bolted to the underside of the tipper body. Where bolts extend to the load carrying side of the tipper body, the bolt heads are suitably protected to reduce wear. The bolted arrangement, which may also include an elastomeric pad, would function to isolate the pad structurally from the floor.

It will be seen that in the illustrated embodiments, the hoist pivots are separate from, i.e. not welded or integral with, the tipping body shell structure so that in use, high stress concentrations are removed or significantly lessened in the tipping body shell. This results in a simplified structure for the tipping body which may be fabricated by welding, and will be lighter than known fully reinforced welded structures, enabling higher payloads to be carried within permissible total load limits. In addition, a replacement tipping body may be provided which does not change the nature of the rear dump truck operation or require significant change to the supporting truck for its adaption.

While the above described embodiments utilise large radius or substantially flat panel portions against which the separate hoist pivots push, these panel portions could be formed as non-planar panels such as corrugated panels and if desired the load bearing pads can have a conforming shape.

The described embodiments have been given as non-limiting illustrative examples of this invention, and modifications and variations thereto as would be apparent to persons skilled in the art may be made thereto within the scope and ambit of the appended claims.

For example, although the illustrated embodiments show a pair of hoist pivots connected to respective tipping rams, the invention may also be embodied in the form of a single hoist pivot operatively connected to a single tipping ram located centrally relative to the width of the truck, e.g. between a pair of spaced longitudinal rail frames.

The invention claimed is:

1. A tipping body for a dump truck, comprising:
a shell structure for holding material, the shell structure being configured for mounting to the dump truck so as to be pivotable about a transverse tipping axis;
a support structure extending longitudinally along an underside of the shell structure, the support structure including at least two longitudinal rails; and
at least two hoist pivots configured for connection to a respective tipping ram connected to a chassis of the dump truck;
wherein the hoist pivots are not integral or welded or rigidly connected to the shell structure;
wherein each hoist pivot is mounted to one of the longitudinal rails, each hoist pivot comprising a pair of spaced flanges, each of the spaced flanges having aligned first bores for receiving a first rod extending through a bore in one of the longitudinal rails, each of the spaced flanges having aligned second bores for receiving a second rod extending through another bore in one of the longitudinal rails, and each of the spaced flanges having a third pair of aligned bores for receiving a connection for an upper part of the respective tipping ram.

2. A tipping body as claimed in claim 1 wherein the support structure is located centrally of the shell structure in a transverse direction, and the tipping body comprises a pair of hoist pivots located on opposite sides of the support structure.

3. A tipping body as claimed in claim 1, wherein each hoist pivot is mounted to the support structure so as to be spaced from the underside of the shell structure when its respective tipping ram is retracted, but movable into abutment with the underside of the shell structure when its respective tipping ram is extended.

4. A tipping body as claimed in claim 1, wherein each hoist pivot is mounted on rods passing through the support structure.

5. A tipping body as claimed in claim 1, wherein opposite longitudinal ends of each hoist pivot are pivotally connected to respective link members mounted on rods passing through the support structure.

6. A tipping body as claimed in claim 1, wherein each hoist pivot is pivotally mounted to the support structure.

7. A tipping body as claimed in claim 1 wherein each hoist pivot is adhered to the underside of the shell structure.

8. A tipping body as claimed in claim 1, further comprising a rigid elongate reinforcing member extending longitudinally between each hoist pivot and an anchor point on the tipping body for resisting longitudinal forces on the hoist pivot.

9. A tipping body as claimed in claim 1, wherein the underside of the shell structure at opposite sides of the support structure and forward of the tipping axis is substantially free of transverse reinforcement formations and is formed as a single skin structure.

10. A dump truck comprising:
a chassis;
a tipping body pivotally mounted to the chassis so as to be pivotable about a transverse tipping axis; and
at least one tipping ram mounted between the chassis and the tipping body,
wherein the tipping body comprises a shell structure for holding material, a support structure extending longitudinally along an underside of the shell structure, the support structure including at least two longitudinal rails, and at least two hoist pivots configured for connection to the at least one tipping ram, the hoist pivots being positioned adjacent the underside of the shell structure;

wherein the hoist pivots i-s are not integral or welded or rigidly connected to the shell structure, wherein each hoist pivot is mounted to one of the longitudinal rails, each hoist pivot comprising a pair of spaced flanges, each of the spaced flanges having aligned first bores for receiving a first rod extending through a bore in one of the longitudinal rails, each of the spaced flanges having aligned second bores for receiving a second rod extending through another bore in one of the longitudinal rails, and each of the spaced flanges having a third pair of aligned bores for receiving a connection for an upper part of a respective tipping ram of the at least one tipping ram.

11. A dump truck as claimed in claim 10 wherein the support structure is located centrally of the shell structure in a transverse direction, and the tipping body comprises a pair of hoist pivots located on opposite sides of the support structure.

12. A dump truck as claimed in claim 10, wherein each hoist pivot is mounted to the support structure.

13. A dump truck as claimed in claim 12, wherein each hoist pivot is mounted to the support structure so as to be spaced from the underside of the shell structure when the tipping ram is retracted, but movable into abutment with the underside of the shell structure when the tipping ram is extended.

14. A dump truck as claimed in claim 10, wherein each hoist pivot is pivotally mounted to the support structure.

15. A dump truck as claimed in claim 10, wherein opposite longitudinal ends of each hoist pivot are pivotally connected to respective link members mounted on rods passing through the support structure.

16. A dump truck as claimed in claim 10, wherein each hoist pivot is adhered to the underside of the shell structure.

17. A dump truck as claimed in claim 10, wherein the underside of the shell structure at opposite sides of the support structure and forward of the tipping axis is substantially free of transverse reinforcement formations and is formed as a single skin structure.

\* \* \* \* \*